United States Patent [19]

Brower

[11] Patent Number: 4,472,153

[45] Date of Patent: Sep. 18, 1984

[54] SUBMINIATURE ARRAY FABRICATING PROCESS

[75] Inventor: Boyd G. Brower, Williamsport, Pa.

[73] Assignee: GTE Products Corp., Stamford, Conn.

[21] Appl. No.: 343,689

[22] Filed: Jan. 29, 1982

[51] Int. Cl.³ .................... G03B 15/02; H05K 3/30
[52] U.S. Cl. .................... 445/28; 361/400; 431/359
[58] Field of Search .............. 445/28; 431/359; 361/400, 401; 362/15; 29/837–840

[56] References Cited

U.S. PATENT DOCUMENTS

| | | | |
|---|---|---|---|
| 2,694,189 | 11/1954 | Wirsching | 339/97 R |
| 3,214,827 | 11/1965 | Phohofsky | 174/68.5 |
| 3,315,071 | 4/1967 | Pfefferle | 431/359 |
| 4,282,559 | 8/1981 | Audesse et al. | 362/15 |
| 4,344,108 | 8/1982 | Collins et al. | 431/359 |

FOREIGN PATENT DOCUMENTS 637372  2/1962  Canada .................. 361/400

Primary Examiner—Kenneth J. Ramsey
Attorney, Agent, or Firm—Thomas H. Bufftton

[57] ABSTRACT

A process for fabricating a miniaturized multilamp photoflash array includes the steps of forming a printed circuit board having electrical contact pads thereon and a plurality of shaped holes having a wire-receiving portion and a tapered portion extending therefrom, selecting a photoflash lamp having conductive leads, threading the conductive leads through the wire-receiving portion and urging the conducting leads into the tapered portion of the shaped holes and affixing the conductive leads to the electrical contact pads.

18 Claims, 3 Drawing Figures

SUBMINIATURE ARRAY FABRICATING PROCESS

TECHNICAL FIELD

This invention relates to the fabrication of miniaturized multilamp photoflash arrays and more particularly to a process for fabricating miniaturized multilamp photoflash arrays having a printed circuit board with shaped holes wherein a conductive lead is urged into a tapered portion of the shaped holes and affixed to the printed circuit board.

BACKGROUND ART

Recently, a popular form of multilamp photoflash arrays has been the so called "flip-flash" devices which are formed for use with numerous inexpensive cameras and to be thrown away or discarded after use. In such structures, it is common to provide a printed circuit board having a plurality of circuit "runs" or electrical paths and a plurality of contact pads electrically connected to the circuit runs. An aperture is provided in the contact pads and an electrically conductive lead of a photoflash lamp is threaded through the apertures and affixed to the surrounding contact pad.

Understandably, it is not unusual for the contact pads in the above-described structure to have a width in the range of about 0.080 to 0.100 inches. Also, these relatively large contact pads usually have a central aperture for receiving the lead wires of the photoflash lamps. Thus, good electrical contact between the lead wires of the flashlamps and the contact pads is readily achieved.

However, miniaturized multilamp photoflash arrays present other problems. For example, miniaturized arrays usually do not have enough space to permit large contact pads. Also, the contact pads on miniaturized arrays do not surround the lead-receiving apertures due to the limited space between the apertures. Moreover, the above-mentioned limited available space becomes a more critical issue when the printed circuit board is fabricated by a die-stamp technique. Therein, the edges of relatively large holes, such as the wire-receiving apertures, must have a clearance from the cutting edge of the die of about 0.015 inches or the foil from which the conductors of the circuit board is stamped will not be cut. Thus, the conductor lead holes and the contact pads must have a clearance of at least 0.015 inches for a die-stamp fabrication process.

Additionally, it is common to fabricate the above-described structures by merely providing an aperture in the center of an electrical contact pad and passing a conductive lead therethrough. However, such a process is unacceptable in structures wherein space is so limited that centralized apertures in the electrical contact pads are not feasible.

DISCLOSURE OF THE INVENTION

An object of the present invention is to provide an enhanced miniaturized multilamp photoflash array. Another object of the invention is to improve the electrical connection of a photoflash lamp to the electrical circuitry of a miniaturized multilamp photoflash array. Still another object of the invention is to modify a printed circuit board in a manner such that photoflash lamp leads may be received by the circuit board at a location close to the printed circuit board conductive paths and adjusted to an increased distance therefrom. A further object of the invention is to minimize space usage of the printed circuit board by altering the shape of the apertures therein.

These and other objects, advantages and capabilities are achieved in one aspect of the invention by a fabrication process wherein a printed circuit board is formed having a plurality of electrical contact pads thereon and shaped holes having a wire-receiving portion with a tapering portion extending outwardly therefrom, selecting a photoflash lamp with a pair of electrical conductors, threading the electrical conductors of the photoflash lamp through the wire-receiving portion and urging the electrical conductors into the tapered portion of the shaped holes, and affixing the electrical conductors to the electrical contact pads of the printed circuit board.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
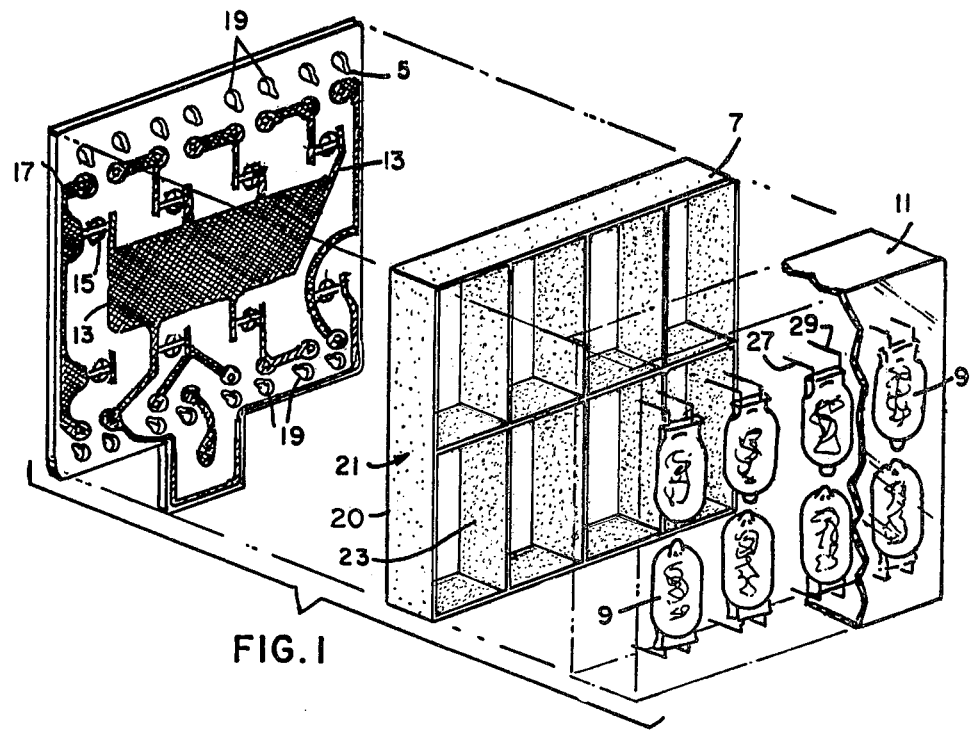
FIG. 1 is an exploded view of a preferred embodiment of a miniaturized multilamp photoflash array.

Referring to the drawings, the miniaturized multilamp photoflash array of FIG. 1 includes a printed circuit board 5, a reflector unit 7, a plurality of flashlamps 9 and a transparent plastic cover 11 formed for attachment to the circuit board 5 and enclosure of the reflector unit 7 and flashlamps 9. The printed circuit board 5 includes a plurality of electrically conductive circuit runs 13 coupled by radiation-responsive switches 15 to electrical contact pads 17. A plurality of shaped holes 19, which will be explained hereinafter, are spaced from the electrical contact pads 17.

The reflector unit 7 includes an upper and lower section, 20 and 21 respectively, with each of the sections 20 and 21 having a plurality of lamp-receiving cavities 23. Also, each of the lamp-receiving cavities 23 includes a reflective surface as well as a pair of apertures 25 extending therethrough.

A flashlamp 9 is positioned for location within each of the lamp-receiving cavities 23 of the reflector unit 7. Each flashlamp 9 includes a pair of electrically conductive leads 27 and 29 which are bent to contact the electrical pads 17 and then threaded through the shaped holes 19 of the circuit board 5 and bent to contact the electrical contact pads 17. Then, the reflector unit 7 is telescoped over the flashlamps 9 and a plastic cover 11 encloses the reflector unit 7 and flashlamps 9.

Figure 2:
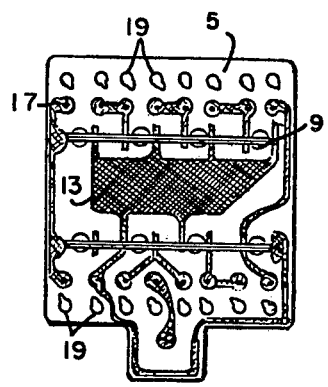
FIG. 2 is a diagrammatic illustration of a printed circuit board utilizing the invention.
Figure 3:
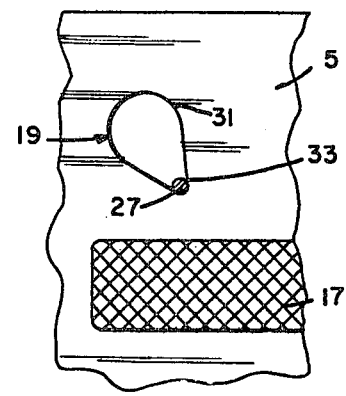
FIG. 3 is an enlarged view of a preferred form of the invention illustrated in FIG. 2.

Referring to the printed circuit board 5, FIGS. 2 and 3 more clearly illustrate the previously-mentioned shaped holes 19 of the array. As can readily be seen, each of the shaped holes 19 is substantially tear-drop shaped and includes a wire-receiving portion 31 and a relatively small end or tapering portion 33 extending laterally therefrom. Usually the tapering portion 33 of the shaped holes 19 is angled toward the electrical contact pads 17 of the printed circuit board 5. In this manner the angle of the tapering portion 33 may be utilized to determine the positional location whereat the electrically conductive leads 27 and 29 of the flashlamps 9 are affixed to the electrical contact pads 17.

Since space is at a premium in miniaturized photoflash arrays and it has been found generally desirable to provide a circuit separation of about 0.06 inches, it has also been found necessary to provide lead holes which are not covered by the electrical contact pads 17. As a result, there is a tendency for the conductive leads 27 and 29 passing through the wire-receiving portion 31 not to make good contact with the contact pads 17. However, having the conductive leads 27 and 29 are located within the tapering portion 31 of the shaped holes 19 and affixing them, as by bending for example to the electrical contact pads 17 appears to provide a much more reliable electrical connection.

Also, it has been determined that a relatively large hole, such as the wire-receiving portion 31 of the shaped hole 19, must be spaced at least 0.015 inches from the cutting edge in a die-stamp process because the die will not cut the foil when the cutting edge crosses a relatively large hole. Thus, the electrical contact pads 17 would have to be at least 0.015 inches from a wire-receiving circular hole. However, by providing the shaped hole 19, the tapered portion 33 can be positioned much closer to the contact pads 17, since it is smaller than the wire-receiving portion 31, and reliability of electrical connection to the contact pads 17 is improved.

Addtionally, it has been found preferable to limit the tapering portion 33 to a distance in the range of about 0.020 to 0.025 inches. Otherwise, one would move the lead a distance greater than the 0.020 to 0.025 inches, and it would be easier to move the entire flashlamp 9 or prebend the conductive leads 27 and 29. In other words, the tapering portion 33 permits movement of the conductive leads 27 and 29 a distance of about 0.020 to 0.025 inches from the wire-receiving portion 31 of the shaped hole 19.

Further, the tapering portion 33 permits the positioning of the shaped hole 19 nearer to a circuit run 13 on the printed circuit board 5 than was previously possible since the conductive leads 27 and 29 are inserted into the wire-receiving portion 31 and then urged into the tapering portion 33 away from the circuit run 13. Thus, the angled tapering portion 33 serves the dual purpose of providing a direction and a distant location for the conductive leads 27 and 29 away from the wire-receiving portion 31 whereat the conductive leads 27 and 29 are initially threaded.

In the process of fabricating the above described miniaturized multilamp photoflash array, a printed circuit board 5 is formed in a manner to provide a plurality of electrical circuit runs 13 and electrical contact pads 19 thereon. Also, the printed circuit board 5 has a substantially tear drop shaped hole 19 therein having a relatively large wire-receiving portion 31 with a relatively small tapering portion 33 extending outwardly therefrom. A photoflash lamp 9 having a pair of electrical conductors 27 and 29 is selected, and the electrical conductors 27 and 29 are threaded through the wire-receiving portion 31 of the shaped hole 19 in the printed circuit board 5.

Thereafter, at least one of the electrical conductors 27 and 29 is urged from the wire-receiving portion 31 to the tapered portion 33 of the shaped hole 19. Then the electrical conductors 27 and 29, positioned in the tapered portion 33 of the shaped hole 19, are bent and then affixed to an electrical contact pad 17 as by soldering, for example.

Thus, a miniaturized multilamp photoflash array and method of fabrication have been provided. The array features a shaped hole which facilitates lead wire insertion and enhanced electrical reliability due to the tapering portion of the shaped hole whereby distance between the wire conductor and the electrical contact pad is minimized. Moreover, the shaped hole permits lead wire insertion nearer to a conductor run than is normally acceptable since the lead wire is urged into the tapered portion of the shaped hole and away from the adjacent conductor run.

While there has been shown and described what is at present considered the preferred embodiments of the invention, it will be obvious to those skilled in the art that various changes and modifications may be made therein without departing from the invention as defined by the appended claims.

INDUSTRIAL APPLICABILITY

An enhanced miniaturized multilamp photoflash array includes a printed circuit board having a spaced hole therein with a wire-receiving portion extending to a tapering portion. A conductive lead from a photoflash lamp is passed through the wire-receiving portion and urged into the tapered portion of the shaped hole. Thereafter the conductive lead is affixed to the printed circuit board. Thus, enhanced electrical connection of the wire conductors as well as reduced distance between the wire conductors and a connecting pad on the printed circuit board are provided.

I claim:

1. A process for fabricating a miniaturized multilamp photoflash array comprising the steps of:
    forming a printed circuit board having at least one electrical contact pad thereon and a shaped hole having a wire-receiving portion and a tapered portion extending laterally and convergingly from said wire-receiving portion;
    selecting at least one photoflash lamp having a pair of electrically conductive leads extending outwardly therefrom;
    threading at least one of said pair of electrical conductors of said photoflash lamp through said wire-receiving portion of said shaped hole and urging said threaded electrical conductor into said tapered portion of said shaped hole extending laterally and convergingly from said wire-receiving portion; and
    effecting contact between said electrical conductor in said tapered portion of said shaped hole and said electrical contact pad of said printed circuit board.

2. The process of claim 1 wherein said printed circuit board includes a plurality of electrical contact pads and a plurality of shaped holes, a plurality of photoflash lamps each having a pair of electrical conductors are selected, and a plurality of electrical conductors are threaded through said wire-receiving portions of said shaped holes, urged into said tapered portions of said shaped holes extending laterally and convergingly from said wire-receiving portions and into contact with said electrical contact pads of said printed circuit board.

3. The process of claim 1 wherein said forming of said printed circuit board includes the positioning of said tapered portion of said shaped holes extending laterally and convergingly from said wire-receiving portion adjacent said electrical contact pads of said printed circuit board.

4. The process of claim 1 wherein said tapered portion of said shaped holes extending laterally and convergingly from said wire-receiving portion are at a distance not greater than about 0.015-inch from said electrical contact pads.

5. The process of claim 1 wherein said forming of said printed circuit board includes the formation of a tapered portion of said shaped holes, said tapered portion extending laterally and convergingly and having a length in the range of about 0.020 to 0.025 inch from the center of said wire-receiving portion of said shaped holes.

6. The process of claim 1 including the step of bending said electrically conductive leads of said photoflash lamps, threading said bent electrically conductive leads through said wire-receiving portion of said shaped holes and urging said bent electrically conductive leads from said wire-receiving portion into said tapered portion extending laterally and convergingly from said wire receiving portion of said shaped holes and effecting contact between said bent electrically conductive leads and said electrical contact pads of said printed circuit board.

7. A miniaturized multilamp photoflash array having a printed circuit board with an electrical contact pad on at least one surface of said circuit board and a tear drop shaped hole spaced from said contact pad and an electrically activatable flashlamp with a pair of electrically conductive leads extending outwardly therefrom and affixed to said printed circuit board, said array characterized by the improvement wherein said tear drop shaped hole includes a relatively large wire-receiving portion and a relatively small tapered portion extending laterally from said wire-receiving portion toward said electrical contact pad, and at least one of said electrically conductive leads is located within said tapered portion of said shaped hole and bent to connect to said electrical contact pad.

8. The miniaturized multilamp photoflash array of claim 8 wherein said electrical contact pad is adjacent to and spaced from said tapered portion of said shaped hole in said printed circuit board.

9. The miniaturized multilamp photoflash array of claim 8 wherein said wire-receiving portion of said shaped hole is adjacent a circuit run on said printed circuit board with said tapered portion extending laterally from said wire-receiving portion away from said circuit run and toward said electrical contact pad.

10. The miniaturized multilamp photoflash array of claim 8 wherein said tapered portion extends from said wire-receiving portion of said shaped hole for a distance in the range of about 0.020 to 0.025 inches.

11. The miniaturized multilamp photoflash array of claim 8 wherein said tapered portion of said shaped hole is at a distance of less than about 0.015 inches from said electrical contact pad of said printed circuit board.

12. The miniaturized multilamp photoflash array of claim 8 wherein said tapered portion of said shaped hole determines the location of attachment of said electrically conductive lead of said photoflash lamp to said electrical contact pad of said printed circuit board.

13. The miniaturized multilamp photoflash array of claim 8 wherein said electrical contact pad is spaced from said shaped hole of said printed circuit board and said electrically conductive lead of said photoflash lamp passes through said tapered-portion of said shaped hole.

14. In a miniaturized multilamp photoflash array having a plurality of photoflash lamps each with a pair of outwardly extending leads and a printed circuit board with an electrical contact pad on at least one surface and a tear drop shaped hole spaced from the contact pad, the improvement wherein said tear drop shaped hole includes a relatively large wire-receiving portion and a relatively small tapered portion extending laterally therefrom and at least one of said leads of at least one of said plurality of flashlamps is bent and affixed to said contact pad on said printed circuit board of and located within said tapered portion of said shaped hole and is affixed to said contact pad on said printed circuit board.

15. The improvement of claim 14 wherein said tapered portion of said spaced hole of said printed circuit board is adjacent said electrical contact pad on said printed circuit board.

16. The improvement of claim 14 wherein the direction of said tapered portion of said shaped hole determines the positional location of attachment to said electrical contact pad of a lead of a photoflash lamp passing therethrough.

17. The improvement of claim 14 wherein said wire-receiving portion of said shaped hole is formed for passage therethrough of a lead from at least one of said flashlamps and said tapered portion of said shaped hole is formed to receive at least one of said lead urged from said wire-receiving portion to said tapered portion.

18. The improvement of claim 14 wherein said tapered portion of said shaped hole is at a distance less than about 0.015 inches from said electrical contact pad of said printed circuit board.

* * * * *

UNITED STATES PATENT AND TRADEMARK OFFICE
CERTIFICATE OF CORRECTION

PATENT NO. : 4,472,153
DATED : September 18, 1984
INVENTOR(S) : Boyd G. Brower

It is certified that error appears in the above-identified patent and that said Letters Patent are hereby corrected as shown below:

| | |
|---|---|
| Claims 8-13, lines 2; | please cancel "8" and substitute --7--. |
| Claim 14, line 11; | after "circuit board", please cancel --of--. |
| Claim 14, lines 13, 14 | after "shaped hole", please cancel --and is affixed to said contact pad on said printed circuit board--. |

Signed and Sealed this

Second Day of April 1985

[SEAL]

Attest:

DONALD J. QUIGG

Attesting Officer     Acting Commissioner of Patents and Trademarks